(12) United States Patent
Bedingfield et al.

(10) Patent No.: US 7,799,997 B2
(45) Date of Patent: Sep. 21, 2010

(54) INNERDUCT STRUCTURE HAVING INCREASED FLEXIBILITY

(75) Inventors: Steven Lee Bedingfield, LaGrange, GA (US); David Drew Morris, Newnan, GA (US); Charles William Prestridge, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 11/796,288

(22) Filed: Apr. 27, 2007

(65) Prior Publication Data

US 2008/0264669 A1 Oct. 30, 2008

(51) Int. Cl.
*H02G 15/08* (2006.01)
(52) U.S. Cl. ......................................................... 174/93
(58) Field of Classification Search .................... 174/93; 138/116, 119; 139/420 R
See application file for complete search history.

(56) References Cited

U.S. PATENT DOCUMENTS

| | | | |
|---|---|---|---|
| 4,582,093 A | 4/1986 | Hubbard | 138/111 |
| 5,027,864 A | 7/1991 | Conti | 138/177 |
| 5,587,115 A | 12/1996 | Allen | 264/1.24 |
| 5,843,542 A * | 12/1998 | Brushafer et al. | 428/36.1 |
| 6,262,371 B1 | 7/2001 | Allen | 174/68.1 |
| 6,304,698 B1 | 10/2001 | Morris | 385/100 |
| 6,398,190 B1 | 6/2002 | Li | 254/134.4 |
| 6,571,833 B1 | 6/2003 | McLarty, III et al. | 138/116 |
| 6,886,601 B2 | 5/2005 | Allen | 138/107 |
| 6,963,031 B2 | 11/2005 | Gladfelter | 174/74 A |
| 7,078,615 B2 | 7/2006 | Gladfelter | 174/36 |
| 2003/0015248 A1 * | 1/2003 | Itoh | 139/420 R |
| 2003/0142933 A1 | 7/2003 | Morris | 385/100 |
| 2004/0081411 A1 | 4/2004 | Gladfelter et al. | 385/100 |
| 2005/0185902 A1 | 8/2005 | James et al. | 385/100 |
| 2006/0016507 A1 * | 1/2006 | Baer | 139/383 R |

FOREIGN PATENT DOCUMENTS

| | | |
|---|---|---|
| DE | 102 04 019 | 8/2003 |
| EP | 1 385 246 | 1/2004 |
| WO | WO 2004/020888 | 3/2004 |
| WO | WO 2008/027467 | 3/2008 |

OTHER PUBLICATIONS

Patent Cooperation Treaty PCT International Search Repor. Date of Mailing, Jul. 22, 2008. International Application No. PCT/US2008/001501.

* cited by examiner

*Primary Examiner*—Chau N Nguyen
(74) *Attorney, Agent, or Firm*—Cheryl J. Brickey (57) ABSTRACT

Provided herein are flexible, low friction innerduct structures configured to contain at least one cable within a conduit. The innerduct structures, or conduit inserts, include one or more strip-shaped panels of flexible material that are joined to define at least one channel through which a cable can extend. The innerduct structures preferably are formed from a woven textile fabric having warp yarns that are monofilaments and fill yarns that are an alternating pattern of monofilament yarns and multifilament yarns. Such construction increases the flexibility of the fabric, as compared to previous innerduct fabrics, resulting in a reduction of the pulling force required to draw the cable through the innerduct and into position.

16 Claims, 8 Drawing Sheets

FIG. -8-

INNERDUCT STRUCTURE HAVING INCREASED FLEXIBILITY

TECHNICAL FIELD

The present disclosure generally relates to various apparatus for the installation of cables into underground conduits. More particularly, the apparatus described herein, when installed into a conduit, provides discrete partitioned areas within the conduit into which cables, such as fiber optic cables, coaxial cables, and the like, may be positioned. Such discrete partitioned areas are in the form of longitudinal channels formed by layers of flexible, preferably textile, material. Such apparatus, which exhibit a lower material stiffness than previous conduit inserts, facilitate the installation of multiple cables into a given conduit size by reducing the pulling tensions required to install both the apparatus and the cables. Moreover, the textile components and the various configurations employed herein are particularly well-suited for installing cables in conduits having a relatively small diameter.

BACKGROUND

Cable, such as fiber optic communication cable, is often provided underground in great lengths, and may even extend for many miles. It is known in the art to bury the cable in the ground so that the area above-ground is not cluttered with the cable and its respective support apparatus. Furthermore, by positioning the cable underground, it is more protected from the weather and other potentially damaging circumstances.

It is also known in the cable art to position the cable within a conduit in order to more fully protect the cable during in-ground installations. The conduit, which is often formed from lengths of polyvinyl chloride tubing or the like, is laid in the ground, after which a rope is placed in the conduit either by blowing or rodding. The rope, in turn, is attached to one of the communication cables. By pulling the rope from one end of the conduit, the cable is drawn through the conduit into position. Once placed within the conduit, the cable is protected from damage which may be caused by weather, water, and the like.

When a conduit is in place, it may be subsequently desired to run a second communications cable at the same location. As such, it would be desirable from a cost and time standpoint to make use of the dead space within an existing conduit, rather than lay a new length of conduit. However, it has been found that it is difficult to merely insert a second cable into a conduit that already contains a first cable. When a rope is blown or "snaked" into a conduit already containing a cable (or when a second cable is "snaked" through a conduit with a pre-laid cable), the rope (or cable) is often impeded by the first cable. In such cases, the rope (or second cable) becomes tangled with, or twisted around, the first cable, causing damage to the cables.

It has been suggested to provide a divider to be inserted into a conduit in order to separate the conduit into discrete sections, thus making insertion of the second cable easier. A problem has been encountered in that when conduit is placed over long distances, undulations will invariably occur therein. Also, planned curves, such as at underpasses or the like, will often be encountered rendering the placement of known dividers therein difficult, if not impossible.

A need exists, therefore, for a device to separate or partition a conduit, such as an underground communication cable conduit, into discrete sections. The device must be capable of being inserted into a conduit that is already in place, which may undulate over many miles, and which may have sharp turns therein. A need also exists for a partitioning device which will provide for improved use of the space within a conduit.

U.S. Pat. No. 6,304,698 provides one solution to the problems described above. While particularly effective at partitioning relatively large conduits (that is, those having an interior diameter of at least four inches), it was discovered that improvements to the innerduct configuration and to the fabric construction would reduce the pulling tensions experienced by the innerduct and cables during installation. As a result, the likelihood of cable damage during installation is minimized. Additionally, the fill ratio, particularly for small diameter conduits, is increased, when using the present innerducts. Such improvements to the textile innerduct of the '698 patent are the subject of this disclosure.

SUMMARY

Provided herein are flexible, low friction innerduct structures configured to contain at least one cable within a conduit. The innerduct structures, or conduit inserts, include one or more strip-shaped panels of flexible material that are joined to define at least one channel through which a cable can extend. Preferably, the innerduct structures are formed from a woven textile fabric having warp yarns that are monofilaments and fill yarns that are an alternating pattern of monofilament yarns and multifilament yarns. Alternately, the innerduct structures are formed from a woven textile fabric having warp yarns that are monofilaments and fill yarns that are all multifilaments. Such constructions reduce the stiffness of the fabric, as compared to previous innerduct fabrics, resulting in a reduction of the pulling force required to draw the flexible innerduct through the conduit and to draw the cable through the innerduct.

In a first embodiment, multiple strip-shaped panels are positioned over one another and joined along their longitudinal edges to form a multi-channeled innerduct structure. In a second embodiment, single strip-shaped panels are folded onto themselves in the longitudinal direction and attached proximate to their respective longitudinal edges to define a longitudinal channel through which a cable may be pulled. Alternately, in a third embodiment, individual strip-shaped panels may be folded along one or more longitudinal axes and attached proximate to their longitudinal edges and to the longitudinal axes along which the strip-shaped panels have been folded. Pluralities of structures formed according to the second and third embodiments above may be used together or in combination to form an innerduct structure with greater holding capacity.

BRIEF DESCRIPTION OF THE DRAWINGS

The present innerduct structures, their embodiments, and their features shall become apparent from the description which follows, in view of the drawings in which.

DESCRIPTION OF PREFERRED EMBODIMENTS

The innerduct structures described herein are readily manufactured. Each innerduct apparatus provides a structure that allows optical fiber cables to be pulled through without snagging or excessive heat build-up due to friction. In addition, the innerduct structures do not allow contact or alternation losses between adjacent fiber optic cables in other channels of the innerduct.

Pull Lines or Cords

To draw the fiber optic, coaxial, or other cables through the innerduct structure, it is necessary to provide pull lines or cords for such purpose. The pull lines or cords are positioned within the channels of the innerduct, preferably before installation of the innerduct within the conduit. Pull lines, which are tightly woven, relatively flat strips of material, may be used for pulling cables through the innerduct. However, pull cords having a substantially round cross-section may be used successfully with smaller diameter cables.

Preferably, the innerduct material (which will be described below) and the pull cord or line material have respective values of elongation percentage that are substantially equal for a given tensile load. If elongation of the innerduct differs substantially from that of a pull cord or line, one of those structures may lag relative to the other when they are pulled together through a conduit in which they are to be installed together, thus resulting in bunching of the innerduct.

In a preferred embodiment, the pull lines are formed of tightly woven, polyester material, which exhibits a tensile strength of between about 400 pounds and about 3,000 pounds. In an alternate embodiment, a twisted round rope (for example, a multi-ply cord) may be used, where such pull cords are made of polypropylene, polyester, and the like.

Innerduct Fabric Construction

All of the innerduct structures described herein are made using the same fabric construction, as described herein. The fabric material preferably is soft and pliable, allowing the innerduct to be pulled through the conduit without snagging or generating too much heat. To this end, the fabric, which has a weight of about 9.2 ounces per yard (4.8 ounces per square yard), is preferably a plain woven fabric having warp yarn and fill yarns.

Figure 8:
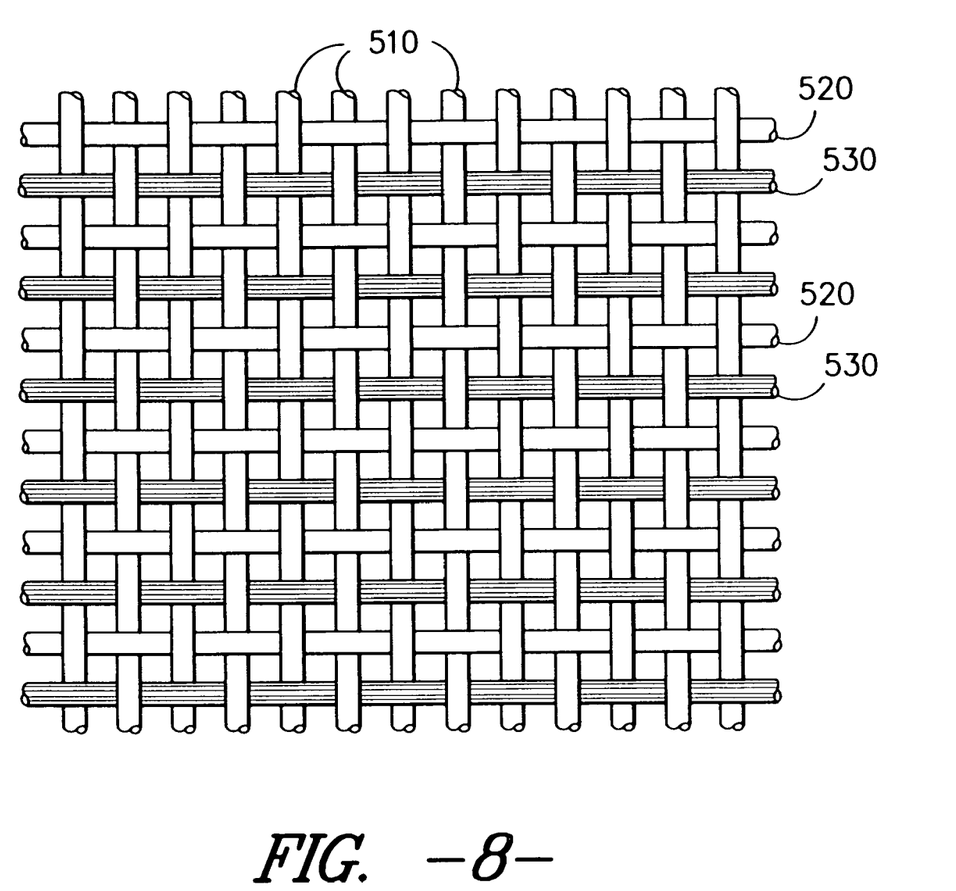
FIG. 8 is a top illustrative view of the woven textile material comprises monofilament warp yarns and an alternating arrangement of monofilament and multifilament filling yarns.

The warp yarns are preferably monofilament yarns made of polyester as shown as warp yarns 510 in FIG. 8. However, yarns made from other polymerizing monomers (e.g., polypropylene or KEVLAR®), yarns made of blended copolymers, and bi- or multi-component yarns of various configurations may instead be used. The end count in the warp direction is preferably between 35 and 70 and, more preferably, is 50. The denier of the monofilament warp yarns is preferably between 400 and 1200 denier, although a preferred embodiment uses warp yarns of 520 denier, which impart the necessary strength to the innerduct structure.

The fill yarns are preferably an alternating arrangement of monofilament yarns 520 and multifilament yarns 530 as shown in FIG. 8. The phrase "alternating arrangement" refers to a repeating pattern of monofilament to multifilament yarns. In one embodiment, the arrangement of monofilament to multifilament yarns is 1:1. Other ratios, such as 1:2, 1:3, 2:3, 3:4, or 3:5, for example, may also be employed, as product specifications dictate. Furthermore, in an alternate embodiment, all of the fill yarns may be multifilament yarns (that is, the ratio of monofilament to multifilament is 0:1).

Most preferably, the monofilament yarns in the fill direction are nylon having a denier from 200 to 800 denier, although one preferred construction comprises nylon yarns having a denier of 350. As with the warp yarns, monofilament yarns made from other polymerizing monomers (e.g., polypropylene), yarns made of blended copolymers, and bi- or multi-component yarns of various configurations may be used in place of the monofilament filling yarns.

The multifilament fill yarns are preferably polyester and, more preferably, are textured polyester, but they may be made of any suitable polymer type. The denier of multifilament fill yarns is preferably in the range of 200 to 1,000 denier, and the desired total denier may be achieved with one ply or with multiple yarn plies. In one preferred construction, a polyester yarn having two plies (2/300) and a total denier of 600 is used. The pick count in the filling direction is preferably between 15 and 35 and, more preferably, is 26.

It should be understood that the number of ends and picks could well be altered. Additionally, it is worth noting that by increasing the number of warp ends (to 52), even with a decrease in the number of fill picks (to 26), the breaking tensile strength of the present fabric is on the order of about 56.1 kg/cm, when 520-denier polyester monofilament yarns are used in the warp direction and 350-denier nylon monofilament yarns and 2/300-denier polyester multifilament yarns are used in the fill direction. By way of comparison, the all-monofilament fabric of U.S. Pat. No. 6,304,698 (having 35 warp ends of 520-denier monofilament polyester and 32 fill picks of 520-denier monofilament nylon 6) exhibits a breaking tensile strength of about 30.7 kg/cm. Preferably, the breaking tensile strength of the present fabric is in the range of from about 45 kg/cm to about 70 kg/cm.

By reducing the monofilament size in the fill direction (that is, from 520 denier to 350 denier) and by adding multifilament yarns in the fill direction, the stiffness of the fabric is reduced, as compared to that described in U.S. Pat. No. 6,304,698. This reduced stiffness (that is, lower rigidity, especially in the fill direction) allows the channels through which cables are pulled to be more readily opened, thus reducing the pulling tension on both the innerduct and the cables during installation. It was found that prior innerduct structures using only monofilaments in both the warp and filling directions tended to "clamp down" on the cables as they were being installed, particularly when the installation was progressing at relatively high speeds. The present fabric construction alleviates this problem.

The fill yarns are flexible and have a low degree of rigidity and a resistance to crimping that helps facilitate the installation of cables through the longitudinal channels. Such crimping or creasing is of less concern in the longitudinal direction of the layers. Therefore, the warp yarns may have a crimp resistance that is less than the crimp resistance of the fill yarns. Such is the case in the preferred embodiment of the panel in which the warp yarns are formed of monofilament polyester, which has a first crimp resistance, and the fill yarns are formed of monofilament nylon 6 and multifilament polyester, the fill yarns contributing to a second, greater crimp resistance. Polyester is preferably used for the warp yarns so as to minimize the elongation differential with the pull lines, which also are preferably formed of polyester.

The crimp resistance can be expressed in terms of the crimp recovery angle. The crimp recovery angle is a measure of the degree to which a sample of the material returns toward a flat unfolded condition after having once been folded 180 degrees about a fold line in accordance with AATCC Method 66. For example, a particular innerduct layer material constructed in accordance with the teachings herein has heatset monofilament polyester warp yarns and monofilament nylon 6 yarns and multifilament polyester yarns in the fill direction. That material was found to have a crimp recovery angle of about 92 degrees in the warp direction and about 140 degrees in the fill direction. In contrast, the fabric of the '698 patent, in which monofilament polyester yarns are used in the warp direction and monofilament nylon 6 yarns are used in the fill direction, exhibits a crimp recovery angle of about 64 degrees in the warp direction and about 125 degrees in the fill direction. Hence, greater crimp recovery angles indicate that the fabric is less likely to be permanently crimped after folding, which translates to a reduction in the pulling tension required to install a cable within the innerduct. Preferably, the crimp recovery angle in the fill direction is between about 120 degrees and about 180 degrees.

The innerduct layer material is preferably rigid in the warp direction and flexible in the fill direction, so that innerducts made therefrom are flexible enough to be pulled easily through turns and undulations in the duct in which they are installed. The INDA IST90.3 test procedure is a method of determining the rigidity of the innerduct layer material. In this procedure, a test sample of flexible material is laid out over a slotted surface. A blade is then used to force the material through the slot. The results are expressed in terms of the applied force.

A panel of innerduct layer material extending transversely across the slot will be forced to bend about a longitudinally extending fold line, and will preferably have rigidity test results within the range of about 50 to about 400 grams. The panel of innerduct layer material exhibits a lesser rigidity in the fill direction than in the warp direction.

The correspondingly greater degree of flexibility in the fill direction helps to reduce the force necessary to open the channel for insertion of a cable therein. For example, the panel of woven innerduct fabric material has fill yarns that are formed of monofilament nylon 6 and multifilament polyester, present in an alternating relationship. Such fill yarns are found to have rigidity test results of about 123 grams. By comparison, when all of the fill yarns are monofilament nylon 6, the rigidity test results are about 477 grams. Thus, the present fabric has considerably greater flexibility in the fill direction, making channels formed from this fabric more readily opened, thus reducing cable pulling tensions.

The elongation percentages of the innerduct material and the pull line material are preferably between 2% and 5% at 22.5 kg of force and between 5% and 10% at 45.5 kg of force. By reducing the elongation potential of the present fabric, the propensity toward "bunching" of the innerduct in the conduit during installation is significantly decreased. Comparative values of elongation are shown below.

|  | Potentially Preferred Example of Present Fabric | Representative Example of U.S. Pat. No. 6,304,698 Fabric |
| --- | --- | --- |
| Warp | Polyester monofilament; 520 denier; 52 ends | Polyester monofilament; 520 denier; 35 ends |
| Fill | 1:1 alternating arrangement; 26 picks Nylon 6 monofilament; 350 denier Polyester monofilament; 2/300 denier | Nylon 6 monofilament; 520 denier; 32 picks |
| Elongation at 22.5-kg weight | 3.8% | 12.0% |
| Elongation at 45.5-kg weight | 8.6% | 19.8% |

Thus, the potentially preferred example of the present fabric exhibits considerably less elongation than that described previously.

The coefficient of friction also can be specified for the innerduct layer material in accordance with the teachings herein. The dynamic or sliding coefficients of friction for the preferred material described above, based on high density polyethylene on the material with a longitudinal line of action, were found to be about 0.12 in the warp direction. Although this tested value of sliding coefficient of friction is most preferred, broader ranges, such as the range from about 0.04 to about 0.16, as well as an intermediate range of about 0.06 to about 0.14, and a narrower range of about 0.08 to about 0.13, may also be used.

Shared Wall Configuration

Figure 1:
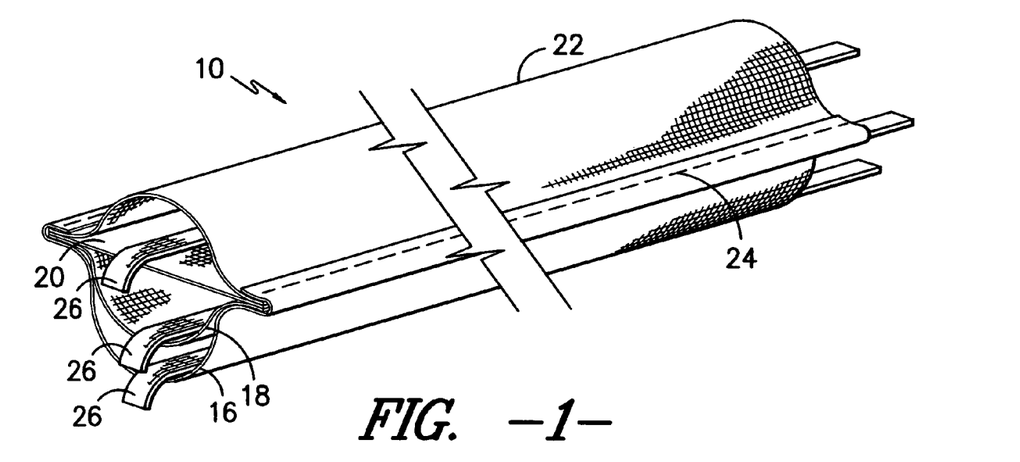
FIG. 1 is an isometric view of a conduit insert apparatus, or innerduct, according to a first embodiment provided herein.
Figure 2:
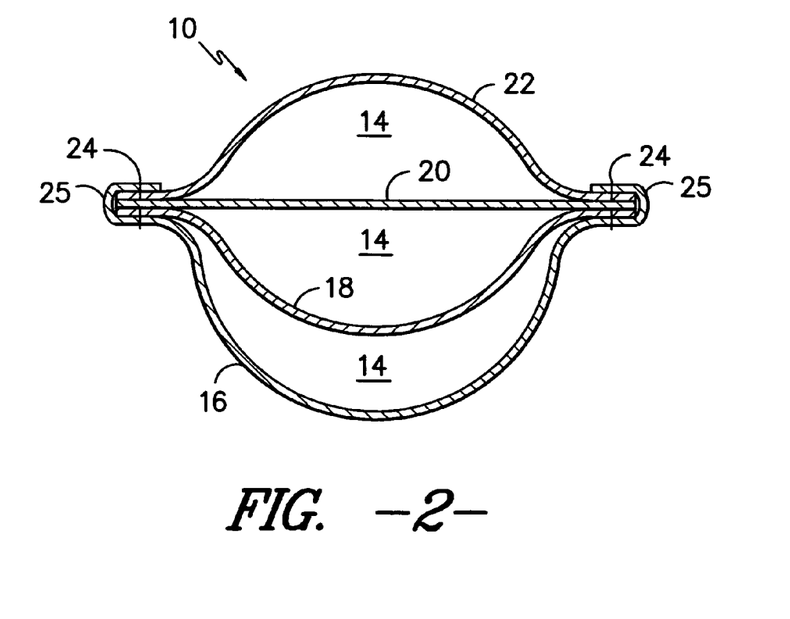
FIG. 2 is a cross-sectional view of the apparatus of FIG. 1.
Figure 3:
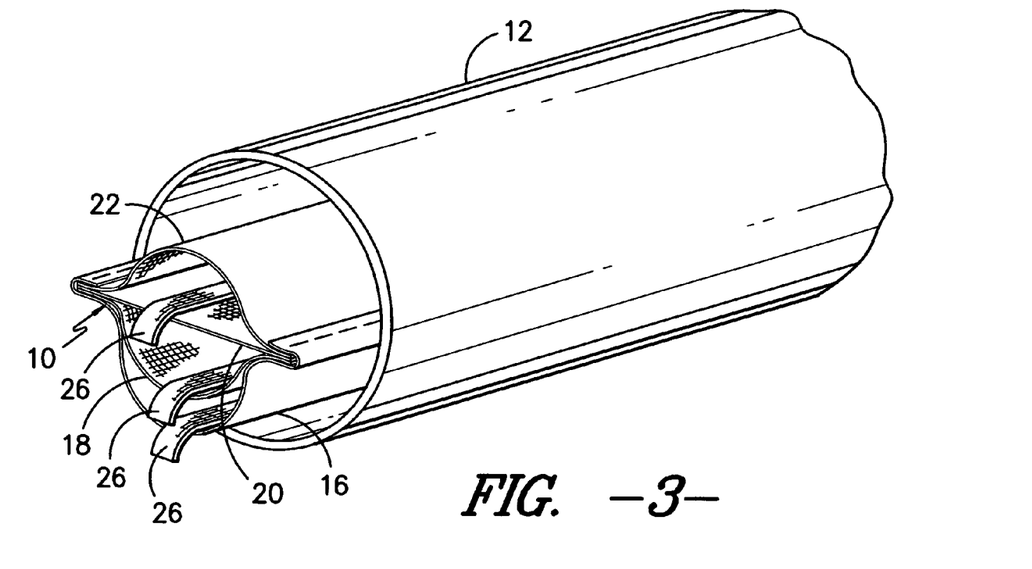
FIG. 3 is an isometric view showing the apparatus of FIG. 1 within a conduit.

Referring now to the drawings, FIGS. 1 and 3 show a first embodiment of an insert, which may be referred to as an innerduct 10, to be inserted in an optical fiber cable conduit 12. This configuration may be referred to as having a "shared wall configuration", because adjacent channels share a common layer, or wall, between them. Each innerduct 10 defines of a plurality of channels 14 which are formed interconnecting layers 16, 18, 20 and 22 of fabric at their opposite longitudinal side edge portions. Such joining is preferably accomplished as shown in FIG. 2, in which the edge portions 25 of the lower layer 16 are lapped over the edge portions of the other layers after which all of the layers 16, 18, 20 and 22 are connected together by sewing (indicated by seam 24). Other suitable methods, such as ultrasonic welding and adhesives (e.g., hot-melt adhesives), for example, may be used instead of, or in addition to, sewing to connect the individual layers.

The innerduct 10 is preferably constructed in the following manner. The fabric used to create the innerduct 10 is initially woven and then slit lengthwise (along the warp, or machine, direction) into panels of varying width. A plurality of successive panels that are joined together end to end form panels that provide the innerduct with a length that may extend, for example, from three to four miles. The center panel 20 is the narrowest, the next adjacent panels 18 and 22 are wider, and the panel 16 is the widest. The innerduct 10 is manufactured in long lengths for insertion in previously installed conduits 12.

Pull lines 26, which may be woven tapes or ropes, are used to pull the optical fiber cables (not shown) through the innerduct structure. In practice, a pull line 26 is tied or otherwise secured to one end of a cable, after which the pull line and cable are pulled through the channels 14 by grasping and pulling the line 26 at the other end. In assembling the innerduct 10, a pull line 26 is preferably placed between the strip-shaped panels 16, 18 and 20, thereby placing a pull line 26 into each of the eventually formed channels 14, before the panels 16-22 are overlapped and joined at their longitudinal edge portions.

The panels 16-22 are mated and joined at their longitudinal edge portions, resulting in the formation of three channels 14 (as shown in FIG. 2) from the bulging of the wider strips 16, 18, and 22. Preferably, the opposite longitudinal side edge portions 25 of the lower panel 16 are folded over those of the other panels and are sewn to form the innerduct 10 shown in FIGS. 1-3. Ideally, the panels 16, 18, 20, and 22 are positioned, with the preferred overlapping, and sewn along one side simultaneously and then along the second side simultaneously. Less preferably, but also acceptably, the sewing is accomplished in multiple steps.

As shown in FIG. 3, a single innerduct 10 is shown in a conduit 12, but it should be understood that multiple innerducts like the innerduct 10 may be inserted in a conduit 12, depending on the diameter of the conduit 12. For example, it is contemplated that three such innerducts can be inserted in a 4" diameter conduit, thus providing nine channels for the insertion of fiber optic cable. When a conduit 12 has an inner diameter of 4", the strip-shaped panel 20 is 3" wide, the panels 18 and 22 are 4" wide, and the panel 16 is 6" wide. The width of the narrowest panel is thus less than the inner diameter of the conduit 12, thus approximating the width of the narrowest panel 20. This helps to minimize frictional engagement of the innerduct 10 with the conduit 12 when the innerduct 10 is being pulled through the conduit 12. It is to be understood that these dimensions are merely representative and are not intended to be limiting of further embodiments of various other innerduct structures as will be described herein.

Figure 4:
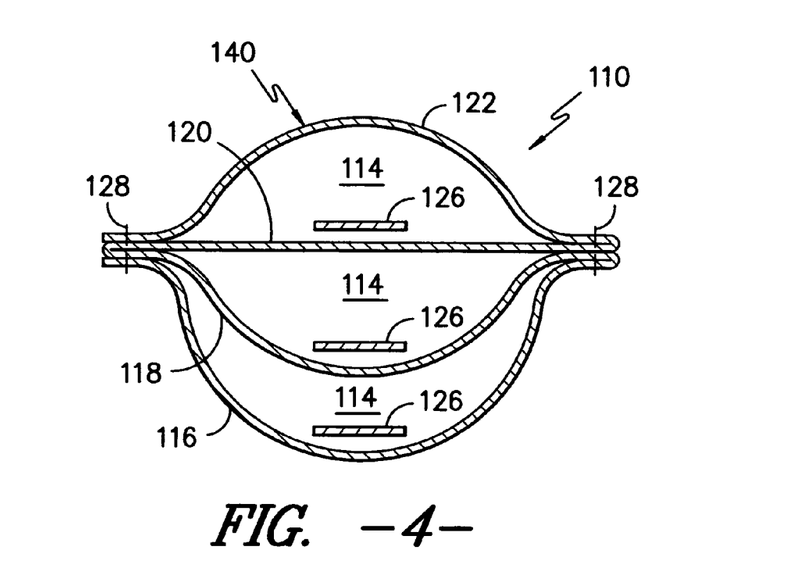
FIG. 4 is a cross-sectional view of an apparatus comprising a variation of the embodiment shown in FIG. 1.

A flexible innerduct structure 110 comprising a second embodiment is shown in FIG. 4. In this embodiment, a wide strip-shaped panel 140 of fabric is cut from a sheet of fabric. A plurality of panels is attached end-to-end to achieve an innerduct 110 of the desired length. The panel 140 is then folded back and forth onto itself to create multiple layers 116, 118, 120, and 122, which define a plurality of channels 114. The panel 140 of fabric is folded onto itself three times, in the exemplary embodiment shown, and the seams 128 along the longitudinal edges and the folded regions define the channels 114. Preferably, the layers 116, 118, 120, and 122 have differing widths between their longitudinal edges, so that the wider layers bulge away from the narrower layers. This imparts an open configuration to the channels 114.

As in the innerduct 10, the open configurations of the channels 114 in the innerduct 110 facilitate insertion of cables longitudinally through the channels 114 by the use of pull lines 126. This is because the spacing between the layers 116, 118, 120, and 122 helps to prevent the innerduct 110 from being pulled along with the cables, and thus helps to prevent bunching-up of the innerduct 110 within the conduit under the influence of the cable and pull lines 126 moving longitudinally through the channels 114.

Tear-Drop Configuration

FIGS. 5A-7E show various embodiments of innerduct structures having a "tear-drop" configuration, where there is a single seam joining the strip-shaped panels. As installed, the seam portion of the innerduct structure is positioned horizontally within the conduit (that is, if the conduit were numbered as a clock face, the seam would be at 3 or 9).

In referring to the tear-drop configuration, it is necessary to define several terms:

The term "strip-shaped panel" refers to a long strip of flexible, textile material (such as that previously described) from which an innerduct is constructed. The strip-shaped panel comprises a plurality of textile strips that are joined end-to-end to reach the desired length for the innerduct structure.

The term "longitudinal edges" refers to the edges along the length of the strip-shaped panel. The longitudinal edges are those edges where attachment of the strip-shaped panel to itself or to other panels occurs.

The term "longitudinal axis" refers to an imaginary line along which the strip-shaped panel is folded. The longitudinal axis is typically located in the approximate center of the strip-shaped panel (i.e., approximately halfway between the longitudinal edges), although the axis may be located more toward one end than another, depending upon the seam configuration to be used. The longitudinal axis also comprises the distal end of the innerduct. In a three-channel configuration where the innerduct is formed from a single strip-shaped panel, two longitudinal axes are present, which are spaced at approximately equal intervals between the longitudinal edges.

The "distal end" of the innerduct structure is that end opposite the end where a seam is located. The "proximal end" of the innerduct structure is that end where a seam is located to join the one or more strip-shaped panels of the innerduct structure.

The term "exterior edge" refers to those edges that are on the outside of the innerduct structure as manufactured. The term "interior" refers to those parts, or edges, of the innerduct structure that are located within the innerduct structure and that are not exposed to the conduit through which the innerduct is pulled.

The term "fold-back seam" refers to a seam configuration in which one or more longitudinal edges of a given strip-shaped panel are folded back (that is, toward the exterior of the innerduct structure) before being sewn.

The term "lap-over seam" refers to a seam configuration in which one longitudinal edge of a given strip-shaped panel laps over the opposite edge of the given strip-shaped panel (for instance, in a single-channel construction) or the exterior edge of an opposite strip-shaped panel (for instance, in a two- or three-channel construction).

Figure 5A:
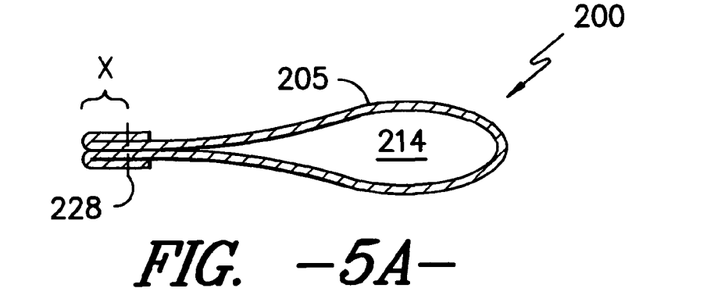
FIG. 5A is a cross-sectional view of an apparatus, or innerduct, according to a second embodiment provided herein, in which a single strip-shaped panel is used to create a single longitudinal channel.

Turning back to the drawings, FIG. 5A is a cross-sectional view of a single channel innerduct structure 200, in which an individual strip-shaped panel 205 is folded along a centrally located longitudinal axis to form a longitudinal channel 214 for housing a cable (not shown). A seam 228 is used to join the strip-shaped panel 205 to itself, thereby forming the channel 214. The longitudinal edges of strip-shaped panel 205 are folded back in the area of the seam 228 to reinforce the seam area. This orientation is referred herein to as a "fold-back seam." The fold-back seam configuration imparts high strength to the seam area, but requires additional fabric for the folded-back portions to achieve the desired channel size. The distance between the seam and the proximal end of the innerduct 200 is defined as "X". In practice, this distance may be as little as 3 to 4 millimeters (mm), depending on the size of the innerduct.

Figure 5B:
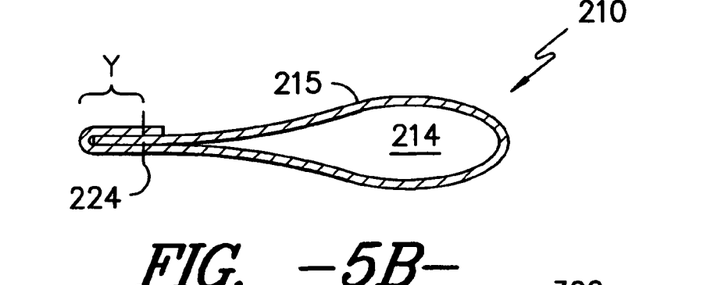
FIG. 5B is a cross-sectional view of a variation of the apparatus of FIG. 5A, in which the single strip-shaped panel overlaps itself.

FIG. 5B is a variation of the innerduct structure of FIG. 5A. As shown, a single-channel innerduct 210 is formed from an individual strip-shaped panel 215 that is folded along a centrally located longitudinal axis to form a longitudinal channel 214 for housing a cable. As before, a seam 224 is used to join the strip-shaped panel 215 to itself, thereby forming the channel 214. One longitudinal edge of the strip-shaped panel 215 is folded over the opposite longitudinal edge to produce what is referred to herein as a "lap-over seam." The lap-over seam configuration tends to result in more efficient fabric utilization, while overlap areas ("Y") of from 8 to 10 mm provide sufficient strength to prevent seam slippage. An added benefit of this seam orientation is that a detectable wire (not shown) may be inserted into the overlap area.

Figure 6A:
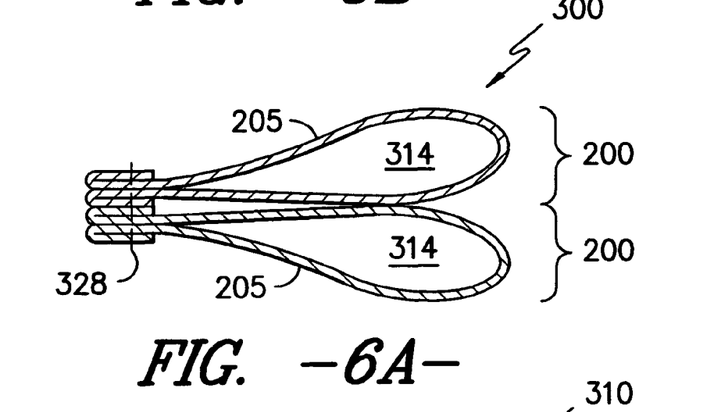
FIG. 6A is a cross-sectional view of an apparatus, or innerduct, according to another embodiment provided herein, in which two individual strip-shaped panels are used to create two longitudinal channels.

FIG. 6A is a cross-sectional view of a two-channel innerduct structure 300, which is formed by the joining of two single-channel innerduct structures 200 (as shown in FIG. 5A) by a seam 328. The resulting innerduct structure 300 has two channels 314 through which a cable may be pulled. As described with regard to FIG. 5A, individual strip-shaped panels 205 are folded along a centrally located longitudinal axis, the axis being placed at the distal end of the innerduct structure 300 and the seam 328 being located at the proximal end of the innerduct structure 300. The respective end portions of the strip-shaped panels 205 are folded-back to produce a reinforced seam area.

Figure 6B:
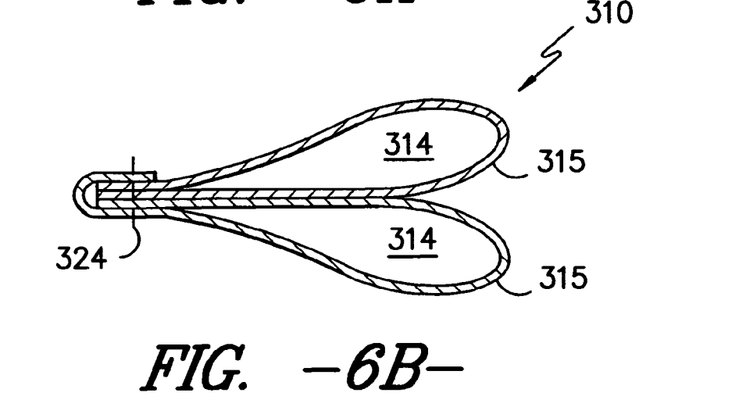
FIG. 6B is a cross-sectional view of a variation of FIG. 6A, in which a first of the strip-shaped panels overlaps the edge of the second strip-shaped panel.

FIG. 6B is a variation of the two-channel innerduct structure of FIG. 6A. As shown, a two-channel innerduct structure 310 is formed from two strip-shaped panels 315 of textile material that are folded along a centrally located longitudinal axis, the axis being placed at the distal end of the innerduct structure 310 and the seam 324 being located at the proximal end of the innerduct structure 310. In this variation, a lap-over seam 324 is constructed by lapping the exterior edge portion of one of the strip-shaped panels 315 over the exterior edge portion of the opposite strip-shaped panel 315. Representative measurements for this configuration include an innerduct having a 40 mm cross-sectional width, which is used to house a 14 mm cable. Again, as with the structure in FIG. 5B, a detectable wire may be inserted into the overlap seam area.

Figure 6C:
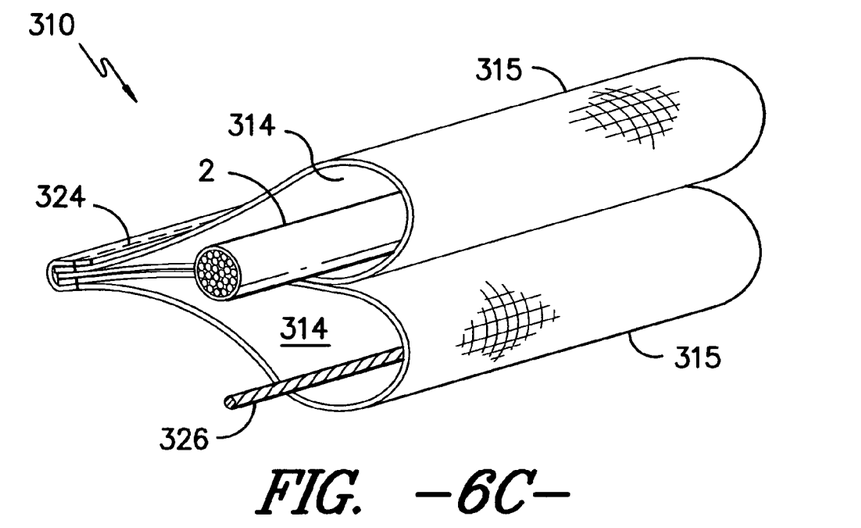
FIG. 6C is an isometric view of the innerduct of FIG. 6B, showing a pull cord and a cable positioned therein.

FIG. 6C is an isometric view of the two-channel innerduct structure 310, which is shown in cross-section in FIG. 6B. As shown, a cable 2, such as a fiber optic cable, is positioned within and through a first longitudinal channel 314. In a second longitudinal channel 314, a pull cord 326 is positioned, such as would be the case in preparation for installation of a second cable into innerduct 310. Pull lines, such as those shown in FIG. 1, may be used instead of pull cords 326.

Figure 6D:
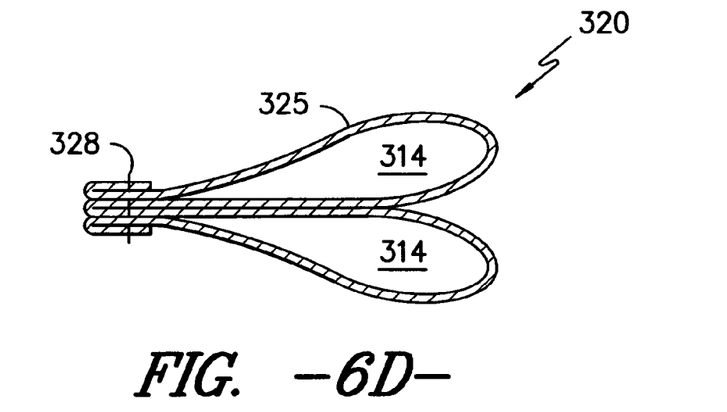
FIG. 6D is a cross-sectional view of an apparatus, or innerduct, according to yet another embodiment provided herein, in which an individual strip-shape layer is folded onto itself along a centrally located longitudinal axis and joined to itself proximate to the longitudinal axis and the longitudinal edges of the strip-shaped panel, thereby forming two longitudinal channels.

FIG. 6D is a cross-sectional view of a two-channel innerduct structure 320, which is formed from one strip-shaped panel 325 of flexible, textile material, which has been folded along a centrally located longitudinal axis. After folding, a fold-back seam 328 is produced, in which the seam 328 connects the longitudinal edges of the strip-shaped panel 325 and the longitudinal axis, thereby forming two longitudinal channels 314 through a cable may be inserted. Such an embodiment is particularly well-suited for innerduct structures having a cross-sectional width of less than 50 mm. One representative innerduct structure 320, according to this configuration, is a two-channel innerduct having a cross-sectional width of about 36 mm, whose channels house cables having a diameter of about 14 mm.

Figure 6E:
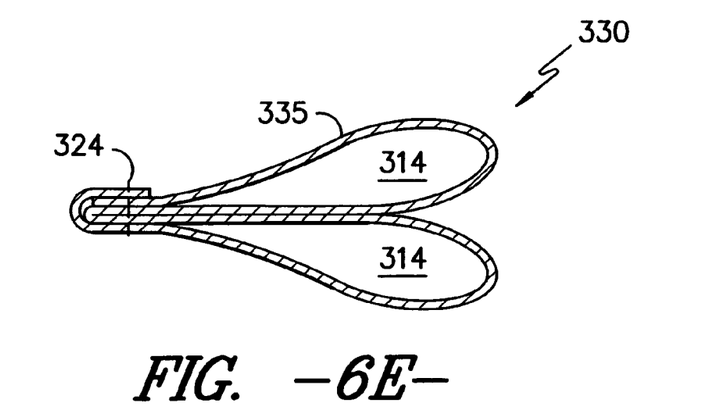
FIG. 6E is a cross-sectional view of a variation of the apparatus of FIG. 6C, in which one longitudinal edge of the strip-shaped panel overlaps the opposite longitudinal edge.

FIG. 6E is a variation of the innerduct structure of FIG. 6D. In this variation, the seam 324 is a lap-over seam, rather than a fold-back seam. In this configuration, one strip-shaped panel 335 of flexible, textile material is folded along a centrally located longitudinal axis, after which the longitudinal edges of the strip-shaped panel 335 and the longitudinal axis are joined by seam 324. The resulting innerduct structure 330 has two longitudinal channels 314.

FIGS. 7A-7E are representative of the cross-sections of various three-channel innerduct structures, which may be formed in accordance with the teachings herein. It should be understood that different combinations of numbers of panels, panel arrangements, and seam configurations may be used without departing from the spirit and intent of the present disclosure.

Figure 7A:
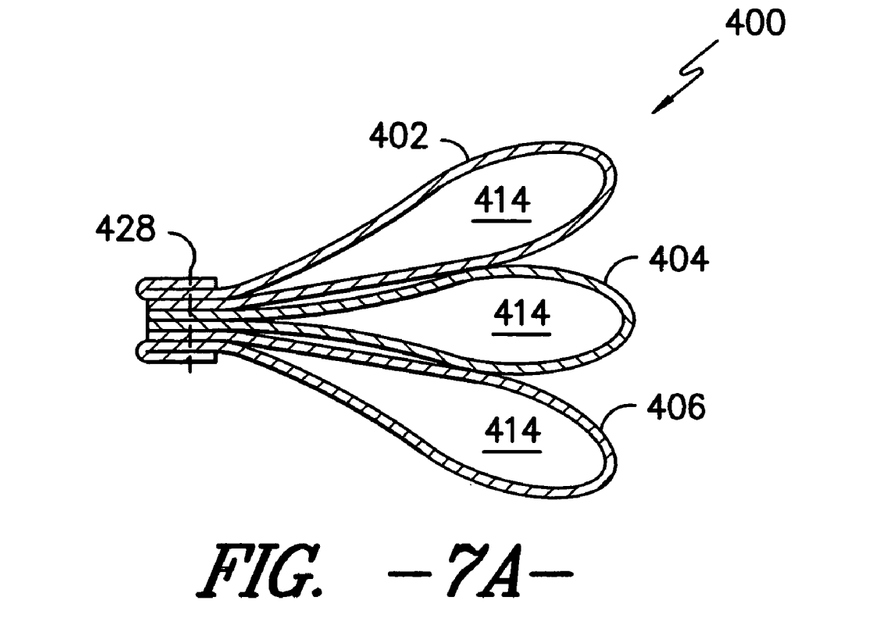
FIG. 7A is a cross-sectional view of an apparatus or innerduct, according to a further embodiment provided herein, in which three strip-shaped panels are folded longitudinally onto themselves and joined at their respective longitudinal edges, thereby forming three longitudinal channels.

FIG. 7A is a cross-sectional view of a three-channel innerduct structure 400, which results from the folding of three individual strip-shaped panels 402, 404, and 406 about their respective, centrally located longitudinal axes and the joining of such panels 402, 404, and 406 at their proximal edges. A fold-back seam 428 is produced by folding back the edge portions of panels 402 and 406 and sewing through the edge portions of all of panels 402, 404, and 406. As a result, three channels 414 for receiving cables are produced.

Figure 7B:
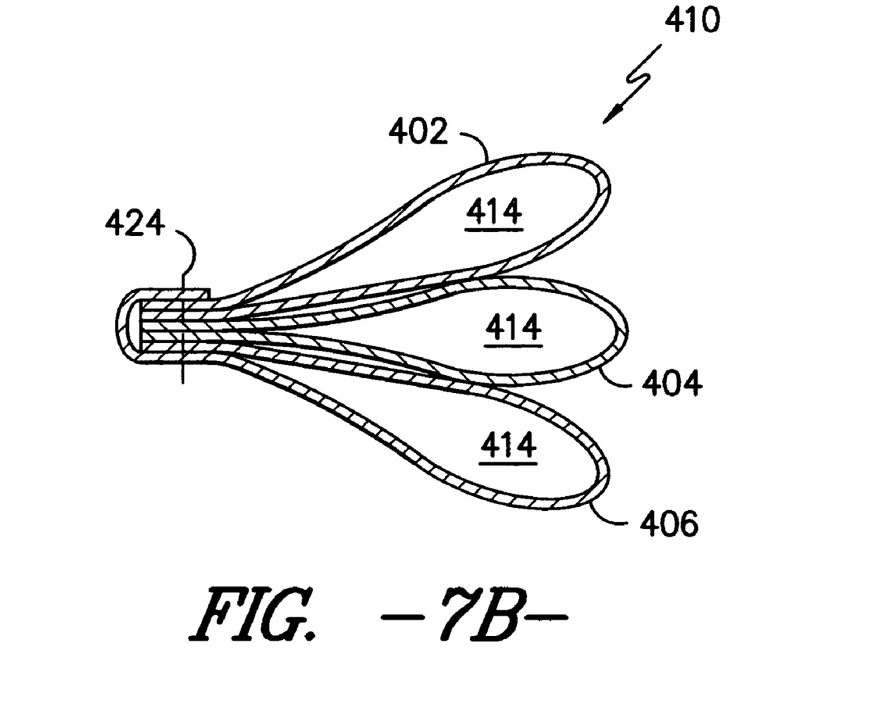
FIG. 7B is a cross-sectional view of a variation of the apparatus of FIG. 7A, in which one longitudinal edge of a first strip-shaped panel overlaps, and is joined to, the longitudinal edge of an opposite strip-shaped panel.

FIG. 7B shows a cross-sectional view of one preferred variation of the innerduct structure of FIG. 7A, in which three strip-shaped panels 402, 404, and 406 are folded about their respective, centrally located longitudinal axes and joined using a lap-over seam 424, where the longitudinal edge portion of panel 406 laps over and is joined to the exterior longitudinal edge of panel 402. The resulting innerduct structure 410 has three longitudinal channels 414 for receiving cables.

Figure 7C:
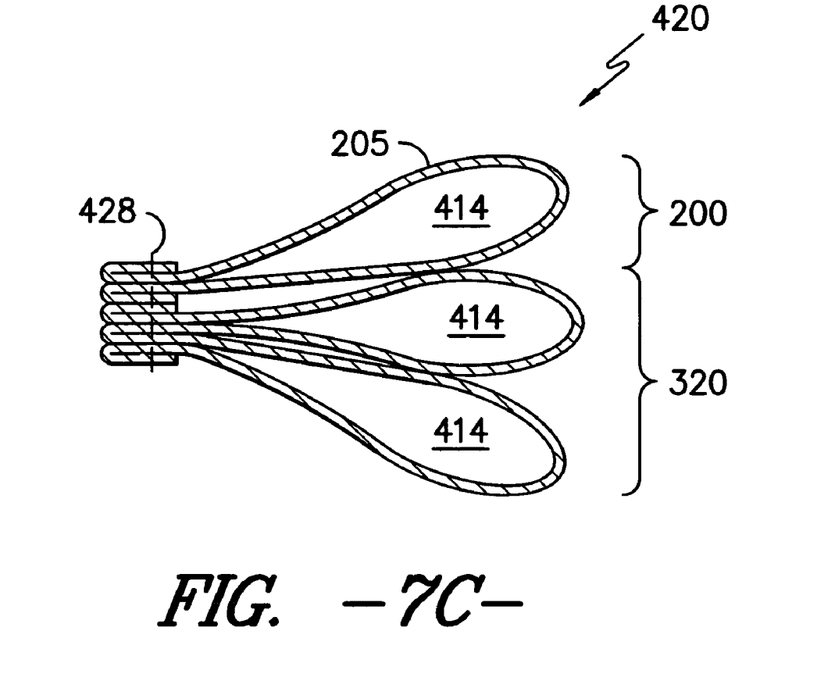
FIG. 7C is a cross-sectional view of a second variation of the three-channel innerduct of FIG. 7A, in which a first strip-shaped panel is folded longitudinally onto itself to form a first longitudinal channel and a second strip-shaped panel is folded along a centrally located longitudinal axis to form two longitudinal channels, where both of the strip-shaped panels are joined at their respective edge portions and along the centrally located longitudinal axis to form three connected longitudinal channels.

FIG. 7C shows a cross-sectional view of another variation of a three-channel innerduct structure. In this embodiment, the one-channel innerduct structure 200 of FIG. 5A is combined with the two-channel innerduct structure 320 of FIG. 6C to form a three-channel innerduct 420. Thus, a first strip-shaped panel 205 of flexible textile material is folded about a centrally located longitudinal axis and a separate, second strip-shaped panel 325 of flexible, textile material is folded about a centrally located longitudinal axis, the respective edge portions of the first panel 205 and the second panel 325 are folded back and secured to one another and the centrally located longitudinal axis of the second panel by seam 428. The resulting innerduct structure 420 has three longitudinal channels 414 for receiving cables.

Figure 7D:
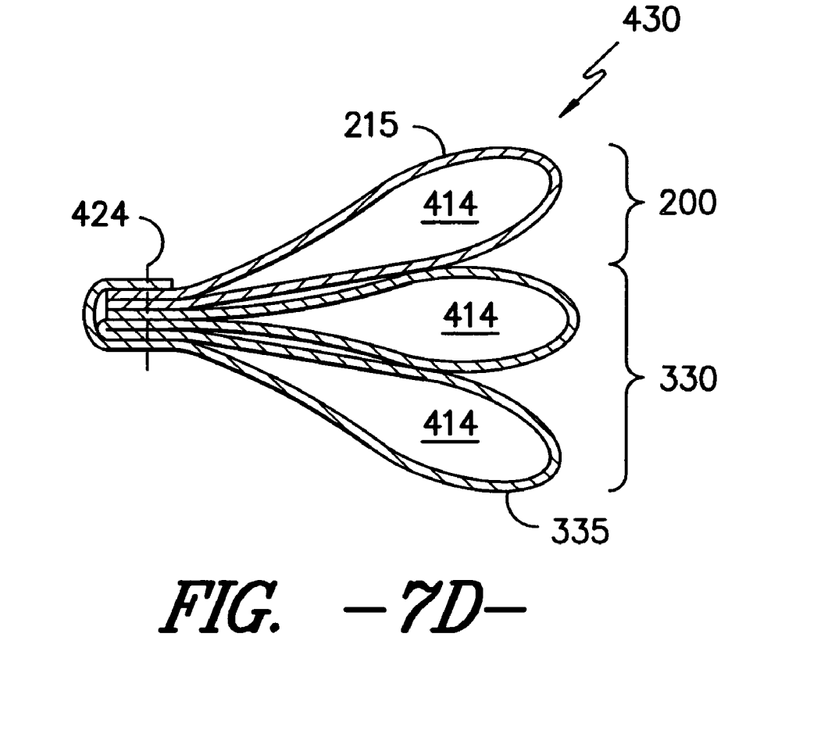
FIG. 7D is a cross-sectional view of a variation of the apparatus of FIG. 7C, in which the longitudinal edge of one of the strip-shaped panels overlaps and is joined to the longitudinal edge of the other of the strip-shaped panels.

FIG. 7D is a cross-sectional view of a variation of FIG. 7C, in which the fold-back seam 428 has been replaced by a lap-over seam 424. Again, a first strip-shaped panel 215 of flexible textile material is folded about a centrally located longitudinal axis and a separate, second strip-shaped panel 335 of flexible, textile material is folded about a centrally located longitudinal axis, the respective edge portions of the first panel 215, the centrally located longitudinal axis of the second panel 335, and the respective edge portions of the second panel 335 being attached by seam 424. The resulting innerduct structure 420 has three longitudinal channels 414 for receiving cables.

Figure 7E:
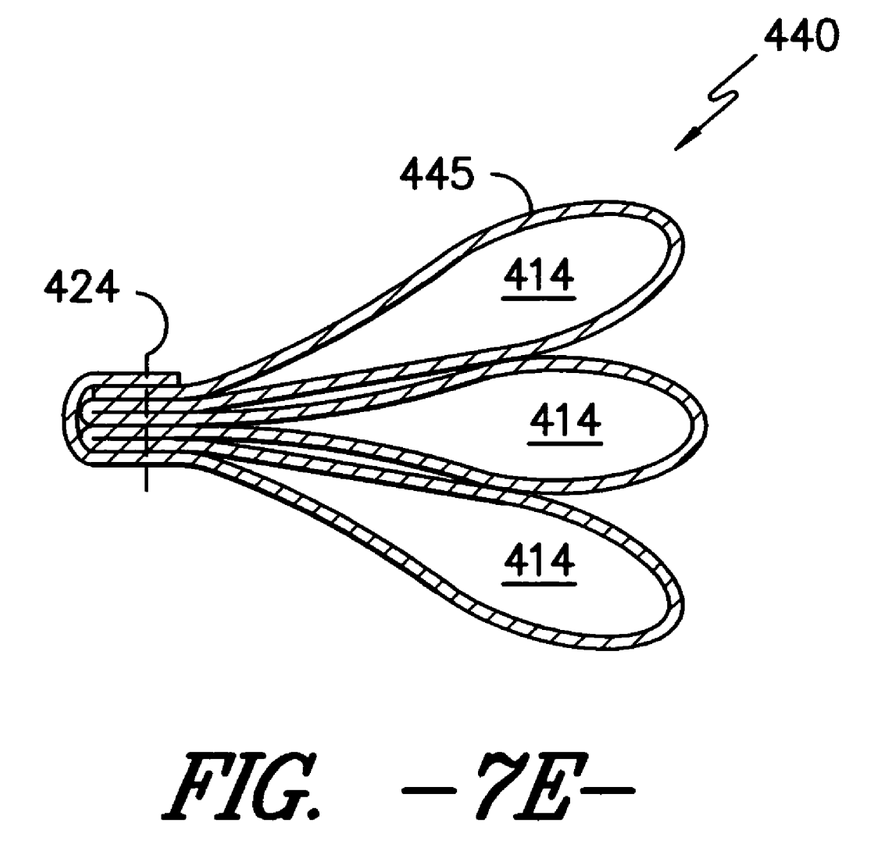
FIG. 7E is a cross-sectional view of yet another three-channel innerduct, in which a single strip is folded along two longitudinal axes with joining of the two longitudinal axes and the two longitudinal edges to form three longitudinal channels.

FIG. 7E is a cross-sectional view of a further variation of a three-channel innerduct. In this embodiment, one strip-shaped panel 445 of flexible, textile material is folded along two longitudinal axes, after which the longitudinal edges of the strip-shaped panel 445 and the longitudinal axes are joined by seam 424. The resulting innerduct structure 440 has three longitudinal channels 414. It should be understood that the longitudinal axes along which panel 445 is folded are appropriately spaced to permit the creation of three channels of approximately equal dimensions, while also allowing for the creation of a lap-over seam.

Installation

It is desirable, for cost reasons, to maximize the fill ratio of a given innerduct within a conduit. The fill ratio is calculated by dividing the sum of the cross-sectional areas of installed cable(s) ($A_{cables}$) by the cross-sectional area of the interior diameter of the conduit ($A_{conduit}$) and multiplying by 100%.

Fill ratio=$(A_{cable} \div A_{conduit}) \times 100\%$

Preferably, the fill ratio is as high as possible. However, for most typical communications cable installations with a standard pulling distance of 250 meters, the fill ratio should not be greater than about 55% to prevent excessive pulling tensions during installation.

Fill ratio$\leq 55\%$

To obtain the maximum benefit from a cable installation, it is preferable to use the largest diameter cables possible for a particular conduit size. The present innerducts, when constructed from a textile having reduced stiffness and when assembled in a tear-drop configuration, facilitate the insertion of larger diameter cables into conduits that were previously limited to smaller cables. By way of example, an innerduct formed of the present fabric and in the tear-drop configuration, which has a width of 58 mm, may successfully be installed into a 50 mm conduit and may successfully carry a 22 mm cable. The fill ratio is calculated as follows:

Fill ratio=$(A_{cable} \div A_{conduit}) \times 100\%$=
$(380.1215 \div 1963.4375) \times 100\% = 19.4\%$ Previously, as in the case of U.S. Pat. No. 6,304,698, it was believed that the size of the conduit dictated the width of the innerduct that may be installed therein. As a general rule, the difficulty of the installation of an innerduct within a given conduit increases as the width of the innerduct increases. Prior innerduct structures, in which the entire innerduct is comprised of monofilament yarns, necessitated that the width of the innerduct be less than the inner diameter of the conduit into which it is installed. Further, the cross-sectional area of the channel ($A_{channel}$) of the innerduct structures is also reduced due to seaming on both sides of the innerduct.

By modifying the textile material to reduce its stiffness and thereby reduce the tension experienced by the innerduct and the cables during installation, the size of the conduit no longer dictates the size of the innerduct that may be used. For example, an innerduct whose width is greater than the interior diameter of the conduit may be installed therein with the innerduct's edges folding onto the interior walls of the conduit. Because the innerduct's dimensions determine the maximum cable diameter that may be used, an increase in the allowable innerduct size within a given conduit results in a corresponding increase in cable size.

EXAMPLES 1-4 AND COMPARATIVES

Four innerduct structures, resembling those of FIG. 7B, were each made by folding three longitudinal strip-shaped panels along a centrally located longitudinal axis and securing their longitudinal edges, using a lap-over seam, to form a three-channel structure. Examples 1-4 were produced in this manner, using strip-shaped panels made of a textile fabric having warp yarns made of polyester monofilaments (520 denier) and fill yarns made of alternating nylon monofilament yarns (350 denier) and textured polyester multifilament yarns (2/300s; 2 plies, 300 denier each, 600 total denier). The fill yarns were arranged in a 1:1 pattern. There were 52 ends in the warp direction and 26 ends in the filling direction. The only difference between the four Examples was in their width.

Comparative Examples were formed in the same configuration as that used for Examples 1-4. However, the Comparative Examples were constructed from an all-monofilament fabric. The warp yarns were polyester monofilaments (520 denier), and the fill yarns were nylon monofilament yarns (520 denier). The only difference between the Comparative Examples was in the width of the innerduct structure.

Innerduct structures having different finished widths were produced and evaluated.

Example 1 and Comparative Example A: 71 mm width
Example 2 and Comparative Example B: 58 mm width
Example 3 and Comparative Example C: 54 mm width
Example 4 and Comparative Example D: 50 mm width All of the tests in the first trial were conducted using a polyvinyl chloride conduit having an inner diameter of 50 mm and a length of 244 meters with no bends or turns. A 19-mm fiber optic cable was also pulled through the innerduct structures and the tensions experienced by the innerduct and the cable were measured using a digital load cell. The innerduct and the cable were pulled through the conduit and innerduct, respectively, using standard mechanical cable installation equipment. The target installation speed for the innerduct structures was 45 meters per minute, plus or minus 5 meters/minute. The target installation speed for the cables was 25 meters per minute, plus or minus 5 meters/minute. The results are shown in TABLE 1 below.

TABLE 1

Evaluation of Pulling Tensions on Innerduct and Cable
(Straight 244-meter Run in 50-mm PVC Conduit)

| Width (mm) | Tension on Innerduct (lbs.) | | Tension on Cable (lbs.) | |
|---|---|---|---|---|
| | Examples | Comparative Examples | Examples | Comparative Examples |
| 71 | 20 | 50 | Not measured | Not measured |
| 58 | 26 | 57 | Not measured | Not measured |
| 54 | 25 | 61 | Not measured | Not measured |
| 50 | 6 | 6 | 47 | 94 |

From these trials, it is readily observable that the fabric described herein reduces pulling tensions on the innerduct itself. Further, in the case of the 50 mm wide innerduct, the pulling tension on a 19-mm fiber optic cable installed therein was also significantly reduced. Such differences will be more apparent from a study of the following trials in which a non-linear conduit run was used.

A second set of trials was conducted using a 218 meter conduit having two 90-degree bends, each with a 1-meter bend radius. In these trials, it was expected that the bends in the conduit would increase the tension experienced by the innerduct and the cable as they were installed, due to the pressure of the conduit in the bend areas. The results of these trials are shown in TABLE 2 below.

TABLE 2

Evaluation of Pulling Tensions on Innerduct and Cable
(218-meter Run with Two 90-Degree Bends in 50-mm PVC Conduit)

| Width (mm) | Tension on Innerduct (lbs.) | | Tension on Cable (lbs.) | |
|---|---|---|---|---|
| | Examples | Comparative Examples | Examples | Comparative Examples |
| 71 | 46 | 132 | Not measured | Not measured |
| 58 | 62 | 88 | 70 | 99 |
| 54 | 45 | 85 | 71 | 114 |
| 50 | 11 | 11 | 73 | 129 |

As can be seen from the data in the TABLES, the innerduct structures themselves experienced significantly less tension during installation when the innerducts were made from the present fabric, rather than an all-monofilament fabric. Further, the cables that were installed into innerducts made of the present fabric also experienced much less tension, as compared to those installed into all-monofilament innerducts.

The following is claimed:

1. Apparatus comprising:
   a conduit;
   a flexible structure positioned inside said conduit, said flexible structure comprising at least one strip-shaped panel of woven textile material folded about a centrally located longitudinal axis and adjoined along the longitudinal edge portions to define at least one longitudinal channel that is configured to enclose and carry a cable, wherein said woven textile material comprises monofilament warp yarns and an alternating arrangement of monofilament and multifilament filling yarns; and
   at least one cable positioned inside said at least one longitudinal channel, wherein said textile material exhibits a rigidity in the range of about 50 grams to about 400 grams.

2. The apparatus of claim 1, wherein said flexible structure defines at least two longitudinal channels.

3. The apparatus of claim 2, wherein said flexible structure defines at least three longitudinal channels.

4. The apparatus of claim 1, wherein said flexible structure comprises at least two of said strip-shaped panels of said woven textile material.

5. The apparatus of claim 4, wherein said flexible material comprises at least three of said strip-shaped panels of said woven textile material.

6. The apparatus of claim 1, wherein said flexible structure has a width that is greater than the interior diameter of said conduit.

7. The apparatus of claim 1, wherein at least two of said strip-shaped panels of said woven textile material comprise said flexible structure, a first of said strip-shaped panels having a width that is greater than said second of said strip-shaped panels, said first strip being positioned in relation to said second panel such that one of said longitudinal edges of said first strip overlaps both of said longitudinal edges of said second strip-shaped panel.

8. The apparatus of claim 1, wherein said longitudinal edges of said plurality of said strip-shaped panels are joined by sewing.

9. The apparatus of claim 1, wherein said longitudinal edges of said plurality of said strip-shaped panels are joined by ultrasonic welding.

10. The apparatus of claim 1, wherein said flexible structure further comprises at least one pulling means positioned inside at least one of said longitudinal channels, said pulling means being selected from the group consisting of a pull line and a pull cord.

11. Apparatus comprising:
    a conduit;
    a flexible structure positioned inside said conduit said flexible structure comprising at least one strip-shaped textile material folded about a centrally located longitudinal axis and adjoined along the longitudinal edge portions to define at least one longitudinal channel that is configured to enclose and carry a cable, wherein said woven textile material comprises monofilament warp yarns and an alternating arrangement of monofilament and multifilament filling yarns; and
    at least one cable positioned inside said at least one longitudinal channel, wherein said textile material exhibits a crimp recovery angle in the fill direction of between about 120 degrees and about 180 degrees.

12. Apparatus comprising:
    a conduit;
    a flexible structure positioned inside said conduit said flexible structure comprising at least one strip-shaped panel of woven textile material folded about a centrally located longitudinal axis and adjoined along the longitudinal edge portions to define at least one longitudinal channel that l et is configured to enclose and carry a cable, wherein said woven textile material comprises monofilament warp yarns and an alternating arrangement of monofilament and multifilament filling yarns; and
    at least one cable positioned inside said at least one longitudinal channel, wherein said textile material exhibits a tensile strength of between about 45 kg/cm and about 70 kg/cm.

13. Apparatus comprising:

a conduit;

a flexible structure positioned inside said conduit said flexible structure comprising at least one strip-shaped panel of woven textile material folded about a centrally Located longitudinal axis and adjoined along the longitudinal edge portions to define at least one longitudinal channel that is configured to enclose and cane a cable, wherein said woven textile material comprises monofilament warp yarns and an alternating arrangement of monofilament and multifilament filling yams; and at least one cable positioned inside said at least one longitudinal channel, wherein said textile material exhibits an elongation at 22.5 kg of between about 2% and about 5%.

14. Apparatus comprising:

a conduit;

a flexible structure positioned inside said conduit, said flexible structure comprising at least one strip-shaped panel of woven textile material folded about a centrally located longitudinal axis and adjoined along the longitudinal edge portions to define at least one longitudinal channel that is configured to enclose and carry a cable, wherein said woven textile material comprises monofilament warp yarns and an alternating arrangement of monofilament and multifilament filling yarns; and at least one cable positioned inside said at least one longitudinal channel, wherein said monofilament warp yarns are polyester yarns, and wherein said monofilament filling yarns are nylon and said multifilament filling yams are polyester.

15. The apparatus of claim 14, wherein said polyester warp yarns extend along the length of said strip-shaped panels.

16. The apparatus of claim 14, wherein said polyester filling yams are textured.

* * * * *

UNITED STATES PATENT AND TRADEMARK OFFICE
CERTIFICATE OF CORRECTION

| | | |
|---|---|---|
| PATENT NO. | : 7,799,997 B2 | Page 1 of 1 |
| APPLICATION NO. | : 11/796288 | |
| DATED | : September 21, 2010 | |
| INVENTOR(S) | : Bedingfield et al. | |

It is certified that error appears in the above-identified patent and that said Letters Patent is hereby corrected as shown below:

In column 13, line 65, after the word "warp", delete the word "yams" and replace with the word "yarns".

In column 14, line 40, after the word "shaped", insert the words --panel of woven-- before the word "textile".

In column 14, line 47, after the word "filling", delete the word "yams" and replace with the word "yarns".

In column 14, line 59, after the word "that", delete "1 et".

In column 15, line 8, after the word "and", delete the word "cane" and replace with the word "carry".

In column 16, line 12, after the word "filling", delete the word "yams" and replace with the word "yarns".

In column 16, line 17, after the word "filling", delete the word "yams" and replace with the word "yarns".

Signed and Sealed this

Twenty-first Day of December, 2010

David J. Kappos
*Director of the United States Patent and Trademark Office*